Aug. 28, 1923.

B. C. MANBY 1,465,991

MEANS FOR ELIMINATING FRICTION BETWEEN THE LAMINATIONS OF LEAF SPRINGS

Filed July 11, 1922  3 Sheets-Sheet 1

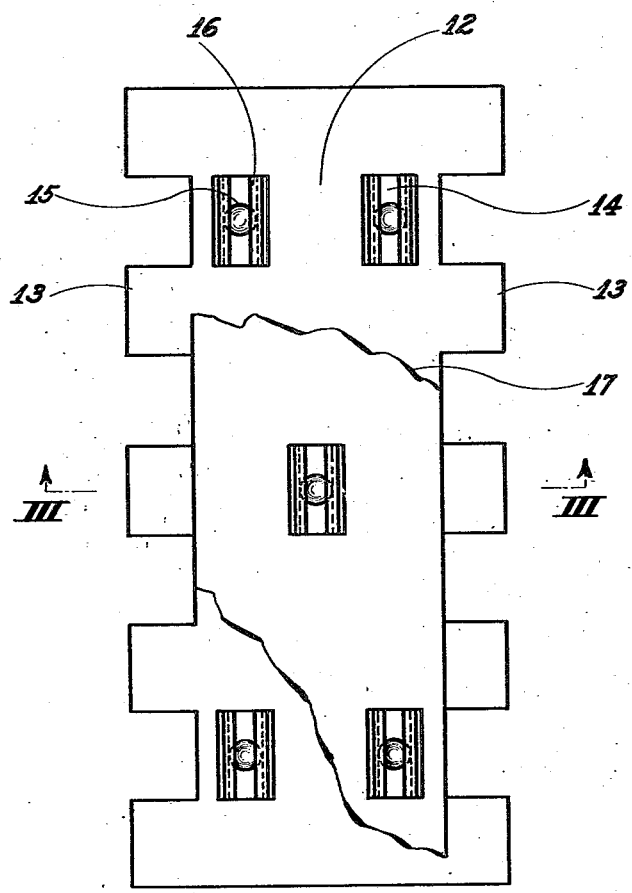

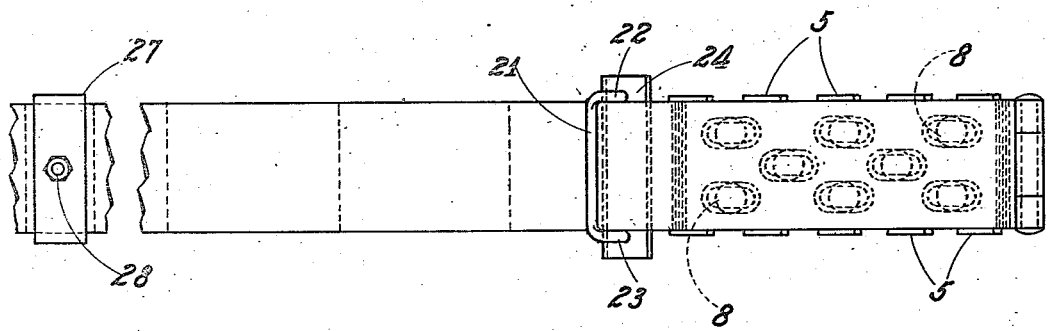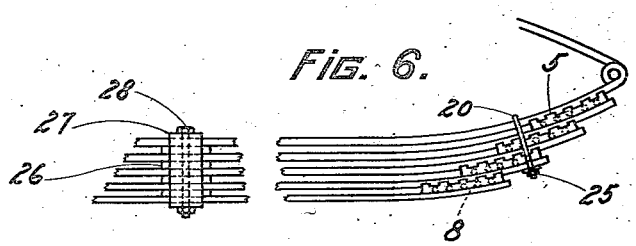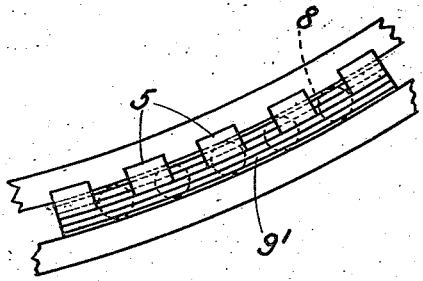

Patented Aug. 28, 1923.

1,465,991

UNITED STATES PATENT OFFICE.

BERTRAM CHARLES MANBY, OF BRISBANE, QUEENSLAND, AUSTRALIA, ASSIGNOR TO CHARLES EDWARD MANBY, OF CARNEGIE, PENNSYLVANIA.

MEANS FOR ELIMINATING FRICTION BETWEEN THE LAMINATIONS OF LEAF SPRINGS.

Application filed July 11, 1922. Serial No. 574,204.

*To all whom it may concern:*

Be it known that I, BERTRAM CHARLES MANBY, a resident of Brisbane, State of Queensland, Commonwealth of Australia, have invented new and useful Improvements in Means for Eliminating Friction Between the Laminations of Leaf Springs, of which the following is a specification.

This invention relates to springs, particularly to leaf springs built up of a series of superposed laminations, and specifically deals with an anti-friction spacing device which is adapted to be disposed between the several laminations adjacent the spring points.

The object of the invention is to provide a spring of the character referred to in which the friction between the laminations thereof will be reduced to a minimum, one in which a greater effective resiliency is obtained, and one in which the power of the spring to absorb shocks is enhanced.

It is a special object of the invention to provide a spring which is particularly adapted for use on motor vehicles, and serves to secure better traction in the driving wheels, hence prolonging the life of the tires used thereon.

It is still a further object of the invention to provide an anti-friction spacing member which may be readily applied to springs already in use, or which forms a part of the spring as initially constructed, and it is also an object to provide an anti-friction spacer which is economical to manufacture and efficient in operation.

Figure 1:
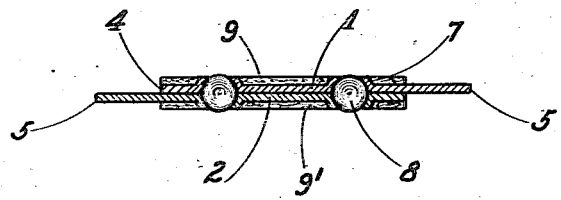
Figure 2:
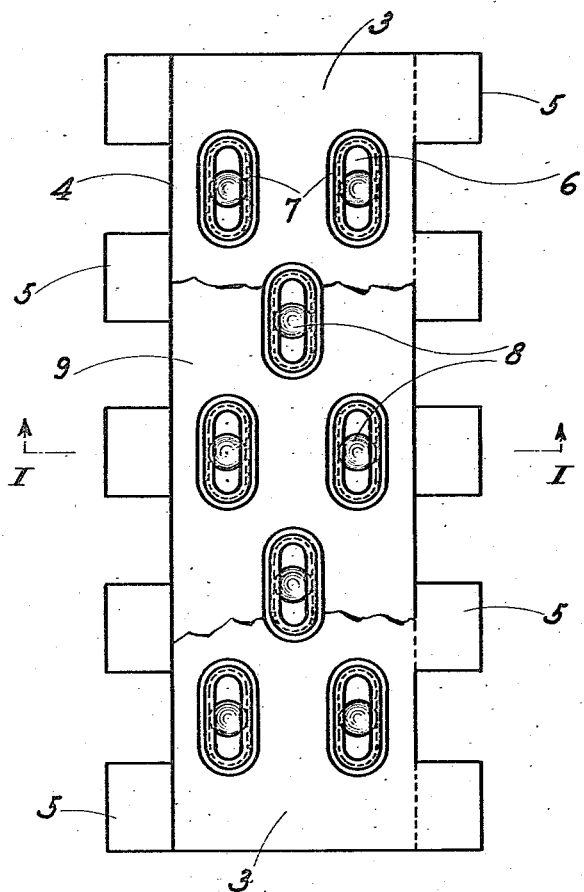

In the accompanying drawings, Fig. 1 is a transverse sectional view of one form of anti-friction spacing device embodying the invention, said section being taken on line I—I of Fig. 2; Fig. 2 a plan view with parts broken away, of the device illustrated in Fig. 1; Fig. 3 a transverse sectional view similar to Fig. 1 of a modified form of the invention, taken on line III—III of Fig. 4; Fig. 4 a plan view, with parts broken away, of the form illustrated in Fig. 3; Fig. 5 a plan view of an assembled spring showing the anti-friction spacers associated therewith; Fig. 6 a side elevation of a spring with the associated anti-friction spacers in which the laminations of the spring are also spaced apart at the spring center; and Fig. 7 a fragmentary detailed elevational view illustrating one of the spacers and its relation with respect to the adjacent laminations between which it is located.

The spacing disc illustrated in Figs. 1 and 2 consists of two similar superposed contacting sections 1 and 2, the said sections being identical in construction, the one being merely inverted with respect to the other. Each of these sections has a body portion 3, one side of which is plane or straight as indicated at 4, while the opposite side is provided with a series of spaced fins or lugs 5. The body portion 3 is provided with a plurality of longitudinal slots or recesses 6. These recesses are somewhat elongated with rounded extremities, the metal of the body surrounding the same being struck up in the form of ribs 7. The form of these ribs is best illustrated in Fig. 1. The slots or recesses 6 in the sections 1 and 2 are so disposed as to be in alignment when the sections are in properly assembled relation, and the ribs 7 cooperate to embrace the anti-friction member, preferably in the form of a spherical ball 8, the diameter of which is sufficient to permit the upper and lower portions of the ball to project slightly beyond the ribs 7.

The sections 1 and 2 are placed facing each other with the ball 8 within the slots 6 and embraced by the ribs 7, the sections being held in assembled relation by any desirable means for such purpose.

Contacting the outer faces of the sections and superposed thereon are the water and dust excluding sheets 9 and 9'. These sheets are made of any suitable material such as oiled felt, and are provided with openings or recesses which are adapted to receive and embrace the ribs 7 of the spacing disk.

In the form illustrated in Fig. 3, the spacing disk proper, indicated at 10, is formed of a single section having a body portion 12 provided with fins or lugs 13 at either side, as clearly indicated in Fig. 4. The body portion is equipped with slots or recesses 14 in which anti-friction balls 15, similar to the ball 8 in Figs. 1 and 2, are disposed. Instead of striking up the metal of the body portion to form ribs surrounding these openings, special strips 16 bent to form are inserted at the opposite sides of the recesses and embrace the anti-friction ball 15 in the manner indicated in Fig. 3. In this form also, sheets 17 of water and dust excluding material are disposed upon the opposite faces of the disk 10, being located in alignment with the openings in the disk.

An anti-friction spacing device such as that described above is disposed between the opposite faces of adjacent laminations of the spring at the spring points, and the lugs 5 or 13, as the case may be, are bent upwardly so as to embrace the sides of the laminations to prevent lateral displacement of the parts. After the desired member of anti-friction spacers are provided between the spring points of the several laminations, the parts are held in assembled relation by means of a clip 20 comprising the U-shaped keeper 21, the limbs 22 of which extend through apertures 23 in a bridge plate 24 which is locked in place by means of the nuts 25 mounted upon the threaded ends of the limbs.

It has been found in practice that with springs containing a large number of laminations, the employment of the necessary complement of anti-friction spacers will result in an abnormal separation of the same at the spring points which tends to increase the rebound action of the spring. In order to overcome this objection, spacing blocks 26 are disposed between the laminae of the spring at the spring center, the laminae and blocks 26 being held in assembled relation in any desired manner as by the rectangular sleeve 27 and bolt 28.

Since the diameter of the anti-friction ball 8 is slightly greater than the thickness of the spacer-disk proper, the opposite faces of adjacent laminations are in constant contact therewith, and whenever relative movement between the laminations occurs, the anti-friction ball will permit the same to take place with the minimum friction, and due to the employment of the water and dust excluding sheets the anti-friction balls and the parts adjacent thereto are at all times thoroughly protected from the ingress of foreign matter interfering or hindering the operation thereof.

A spring constructed according to the invention will not only possess an increased resiliency due to the ease with which the laminations move relatively to each other, but will be more quickly responsive. The latter characteristic is found to be of great practical importance when the springs are used in connection with motor vehicles, resulting in an increased traction due to the driving-wheels hugging the road more constantly, thus not only securing better traction, but prolonging the life of the tires, it being well known that the spinning of the driving-wheels upon leaving the road will result in undue wear upon the tires when the same again contact therewith.

It is thus seen that the invention provides an anti-friction device which may be readily applied to laminated leaf springs already in use or may be initially assembled with the spring parts, a device which is simple in constructon, easy to use and economical to manufacture, but highly efficient in operation.

I claim:

1. A laminated spring comprising a plurality of leaves, a spacing disk between the leaves at the spring-points, having a longitudinal guiding slot through its body portion and ribs at the sides of the slot for retaining an anti-friction ball, an anti-friction ball within the slot for contacting the faces of adjacent leaves, and water and dust excludng means interposed between the spacing disks and said leaves.

2. In combination in a laminated spring having a plurality of superposed leaves, spacers for separating the leaves at the spring center, an anti-friction spacing device between adjacent leaves at the spring-points comprising a disk having a longitudinal guiding slot through its body portion, marginal ribs at the sides of the slot for embracing the anti-friction ball, water and dust excluding strips provided with recesses aligned with those in the said disk and of sufficient size to receive the said ribs, an anti-friction ball within the guiding slot adapted to contact the faces of adjacent leaves, means for binding the leaves together at the spring center, and a clip for retaining the parts in operative assembled relation at the spring-points.

3. A spacer for laminated leaf springs comprising a disk having lateral fins or lugs and provided with an opening through its body, an anti-friction ball within the opening projecting slightly beyond the faces of the disk, and a sheet of water and dust-proof material superposed upon the said disk, the said sheet having perforations in alignment with the opening in the disk.

In testimony whereof I have hereunto set my hand.

BERTRAM CHARLES MANBY.

Witnesses:
 A. CUDDEFORD,
 JUY R. MANBY.